United States Patent [19]

Weistra

[11] Patent Number: 4,696,568

[45] Date of Patent: Sep. 29, 1987

[54] METHOD OF AND APPARATUS FOR MEASURING THE VELOCITY AND/OR THE LENGTH OF MOVING OBJECTS

[75] Inventor: Marten P. Weistra, Eindhoven, Netherlands

[73] Assignee: U.S. Philips Corporation, New York, N.Y.

[21] Appl. No.: 609,244

[22] Filed: May 11, 1984

[30] Foreign Application Priority Data

May 31, 1983 [NL] Netherlands ................. 8301917

[51] Int. Cl.$^4$ .................................. G01P 3/36
[52] U.S. Cl. .................... 356/28.5; 342/104; 367/95
[58] Field of Search ............ 356/28.5; 343/7.5; 367/95; 342/104

[56] References Cited

U.S. PATENT DOCUMENTS

| 3,202,960 | 8/1965 | Galbraith | 369/95 |
| 3,930,734 | 1/1976 | Holly et al. | 356/28.5 |
| 4,373,807 | 2/1983 | Gouesbet | 356/28.5 |

OTHER PUBLICATIONS

P. Buchhave, Optics & Laser Technology, Feb. 1975, vol. 7, No. 1.
W. H. Stevenson, Applied Optics, Mar. 1970, vol. 9, No. 3.

Primary Examiner—Stephen C. Buczinski
Attorney, Agent, or Firm—Robert T. Mayer; Bernard Franzblau

[57] ABSTRACT

A method of and an arrangement for measuring the velocity and/or length of moving objects using the Doppler principle. Measurement of the velocity of objects over a wide range imposes stringent requirements on the bandwidth of the electronic apparatus which process the Doppler shift. The velocity and/or length are measured accurately using simple, narrow-band electronic processing circuits by imparting a pre-shift to the frequency of the electromagnetic wave directed towards the object to be measured. This pre-shift is opposite to the Doppler shift generated by the movement of the object and is realized by imaging a light beam originating from a laser onto the object via a rotating phase grating. The rate of rotation of the phase grating is controlled so that the total Doppler shift measured is always constant.

19 Claims, 4 Drawing Figures

METHOD OF AND APPARATUS FOR MEASURING THE VELOCITY AND/OR THE LENGTH OF MOVING OBJECTS

BACKGROUND OF THE INVENTION

This invention relates to a method of measuring the velocity and/or length of moving objects in accordance with the Doppler principle.

The invention also relates to an arrangement for performing the method.

For the contactless measurement of the velocity and/or the length of moving objects the Doppler principle can be utilized. The frequency shift imparted to an electromagnetic wave after reflection from a moving object is a measure of the velocity v of the object. The length S of the object (or the distance travelled by a point on the object) can be derived from the velocity by integration of the velocity over time t: $S = \int v \, dt$.

Such a method and arrangement are disclosed in the published European Patent Application No. 21048. According to this method two pairs of mutually non-interfering partial beams are generated from a light beam originating from a laser, which beams are projected onto the object to be measured. With each pair of beams the velocity in one dimension is determined by measuring the Doppler shift to which the relevant pair of beams has been subjected. (Strictly speaking, the velocity information is determined from the difference between the Doppler-shifts of the first and second beams of a pair of beams). The velocity range of the objects to be measured determines the width of the frequency band in which the Doppler frequency shifts are located. If the velocity range in which a measurement is to be made is large, then the signal processing unit with which the frequency shift is determined must have a large bandwidth. Owing to variations in reflection or scattering properties of the moving object, interference components are produced in the signal reflected from the object. When the surface of the object has a fine structure, these frequency components may be included in the frequency band of the actual signal, causing the accuracy of the measurement to be influenced adversely. In order to obviate this disadvantage to some extent, it has already been proposed to limit the bandwidth of the signal processing unit by providing a narrow-band band pass filter at the input thereof. This makes it possible to measure only a limited velocity range. Therefore, in order to make it possible to perform measurements in a broad overall velocity range, it has already been proposed to use a filter unit formed by a plurality of bandpass filters having mutually different centre frequencies. By activating that filter which is nearest to the frequency shift produced, narrow-band filtering is then still possible.

In methods other than the above-mentioned proposed methods, use is made of a frequency tracking system (which is commonly referred to as a "tracker"). In those systems the signal processing unit is electronically adjusted so that the very wide frequency variations occurring in the detector signal are tracked.

However, these two systems have the disadvantage that the signal processing unit is complicated and the accuracy for some applications nevertheless leaves much to be desired.

SUMMARY OF THE INVENTION

An object of the invention is to provide a method by means of which the length and/or the velocity of moving objects can be determined accurately and with simple signal processing means. According to a first aspect of the invention, a method as set forth in the opening paragraph is characterized in that it comprises the following steps:

(1) an electromagnetic wave is preshifted to an adjustable degree so as to obtain at least one frequency-shifted or phase-modulated wave;

(2) the preshifted electromagnetic wave is directed towards the moving object;

(3) the Doppler shift of the electromagnetic wave reflected from the object is substantially adjusted to a predetermined fixed frequency value by influencing the preshift of the electromagnetic wave in an opposite sense to the Doppler shift produced by the travel of the object;

(4) the velocity and/or the length of the object is determined from the difference between the Doppler shift and the preshift.

Preshifting must here be understood to allow of two definitions. First, "preshifting" is to be understood to mean that the frequency of the electromagnetic wave is shifted. The extent of the preshift is determined by preshifting means. These means may, for example, comprise a rotating phase grating in which the number of revolutions per unit of time (speed) is adjustable. Second, "preshifting" is to be understood to mean that the phase of the electromagnetic wave is modulated by varying it linearly, more specifically in a sawtooth-shaped way. The extent of preshift is determined by the repetition rate of the sawtooth. Such a phase modulation can be realized by an electro-optical phase modulator.

Methods embodying the invention provide that the frequency of the electromagnetic waves which are reflected from or are scattered by, the object is constant, so that unwanted noise components can be suppressed with the aid of a single narrow-band filter. The net frequency shift of the electro-magnetic waves which are reflected from or are scattered by the object is equal to the sum of the Doppler shift, whose value is proportional to the velocity of the object, and the preshift frequency which is inversely proportional to the value of the Doppler shift.

Preferably, a method embodying the invention provides that the preshifted electromagnetic wave is formed by two sub-waves which are in a fixed phase or frequency relationship to each other.

According to a second aspect of the invention, an arrangement for performing a method embodying the first aspect is characterized in that the arrangement comprises a source for generating electromagnetic waves, preshifting means for producing at least one preshifted wave from the electromagnetic waves originating from the source, means for projecting the preshifted electromagnetic waves onto the object, a detector for detecting at least a portion of the electromagnetic waves reflected from the object and a signal processing unit connected to the detector.

One arrangement embodying the second aspect of the invention is characterized in that the signal processing unit comprises a comparator unit and a frequency standard unit for determining a difference signal which is indicative of the difference between the frequency of the detector signal and the fixed frequency value of the frequency standard unit, that the comparator unit is coupled to the means to adjust the value of the preshifting frequency and that the signal processing unit further comprises a measuring unit for determining the velocity and/or the length from the difference between the Doppler shift and the preshift of the electromagnetic waves.

BRIEF DESCRIPTION OF THE DRAWINGS

Embodiments of the invention will now be described in greater detail by way of example with reference to the drawings, in which corresponding components in the different Figures have the same reference numerals and in which.

DESCRIPTION OF THE PREFERRED EMBODIMENTS

Measuring velocity and/or length by means of electromagnetic waves is divided into two stages. In the first stage electromagnetic waves are projected onto the object to be measured and the scattered and/or reflected waves are applied to a detector. In the second stage the velocity and/or the length is determined from the detected signal in conformity with the natural law contained in the Doppler effect.

Figure 1:
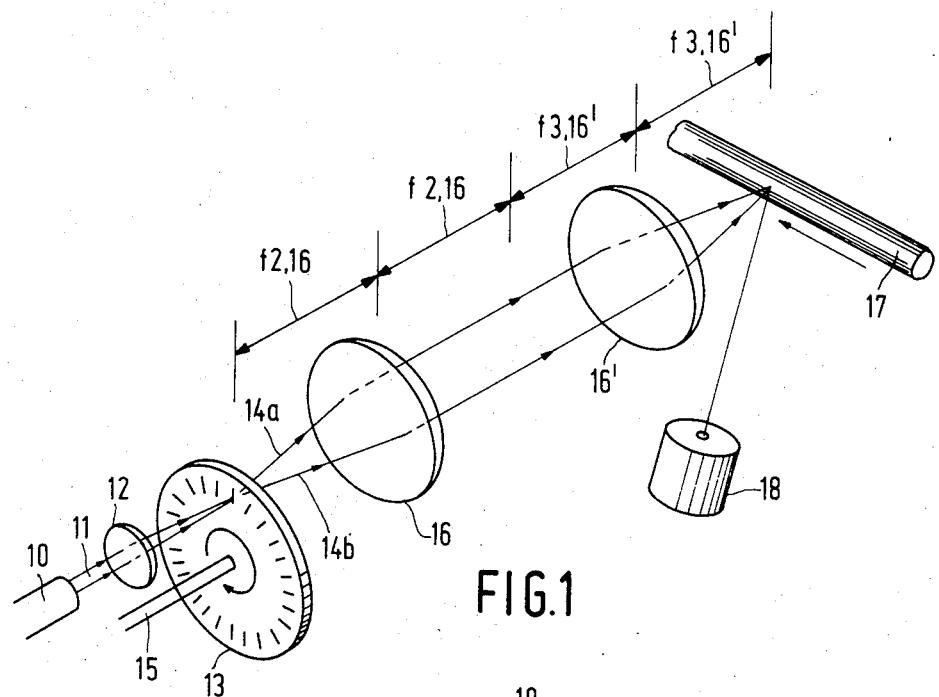
FIG. 1 shows a first form of the first (optical) stage of an arrangement embodying the invention and also serves to illustrate a method embodying the invention.

FIG. 1 shows a first form of the first stage. Reference numeral 10 denotes a source which generates electromagnetic waves. Let it be assumed that source 10 is a laser generating light waves at a frequency f. Instead of a laser, any other suitable type of light source may alternatively be used, such as for example a gas discharge lamp, a solid state radiator, a spectral lamp, etc. A beam 11 generated by source 10 is projected onto a rotating grating 13 via a lens 12. The beam 11 is split into inter alia two first-order beams 14a and 14b, more specifically the first-order-plus beam and the first-order-minus beam. A sinusoidal intensity distribution whose pitch can be chosen within wide limits is obtained in the image plane.

The laser is, for example, of the He-Ne type and has an output power of 2 mW, and the rotating grating is a phase grating having a grating period of 12 $\mu m$ and a diameter of 3 cm . The frequency of the first-order-plus beam is (f+df), whereas the frequency of the first-order-minus beam is (f−df). The grating is mounted on a shaft 15 which is driven by an electric motor (not shown). The speed of rotation of the grating is controlled by controlling the electric motor accordingly.

The two first-order beams 14a, 14b are focused via a lens system 16, 16' on the object whose velocity and/or length are to be measured. The grating 13 is located at the focal point of the lens 16, the object 17 is located at the focal point of lens 16', while the distance between the lens 16 and 16' is equal to the sum of their focal lengths. A least a portion of the light scattered or reflected by the object 17 is incident on a photodetector 18. Because of the velocity v of the object 17, the frequencies of the beams 14a and 14b are influenced by an amount of $f_{1,v}$ and $f_{2,v}$, respectively. The change in frequency of the reflected light may be positive or negative depending on the direction in which object 17 moves. The frequency spectrum of the signal from the photodetector 18 comprises inter alia the frequency $(2df + f_{1,v} - f_{2,v})$. In a manner described hereinbelow, the speed of rotation of the grating is controlled so that the algebraic sum of the frequency preshift due to the grating and the Doppler shift due to the (moving) object is constant. This implies that the frequency $(2df + f_{1,v} - f_{2,v})$ in the output spectrum of the detector is constant and can consequently be easily extracted with the aid of a fixed narrow-band filter. In addition to the carrier frequency f and the further mixed frequency components, the noise components can also be suppressed in a simple and efficient way. These noise components are, for example, a result of the variations in scattering and reflection properties of the object, which result in amplitude modulation of the electromagnetic radiation incident on the detector.

Figure 2:
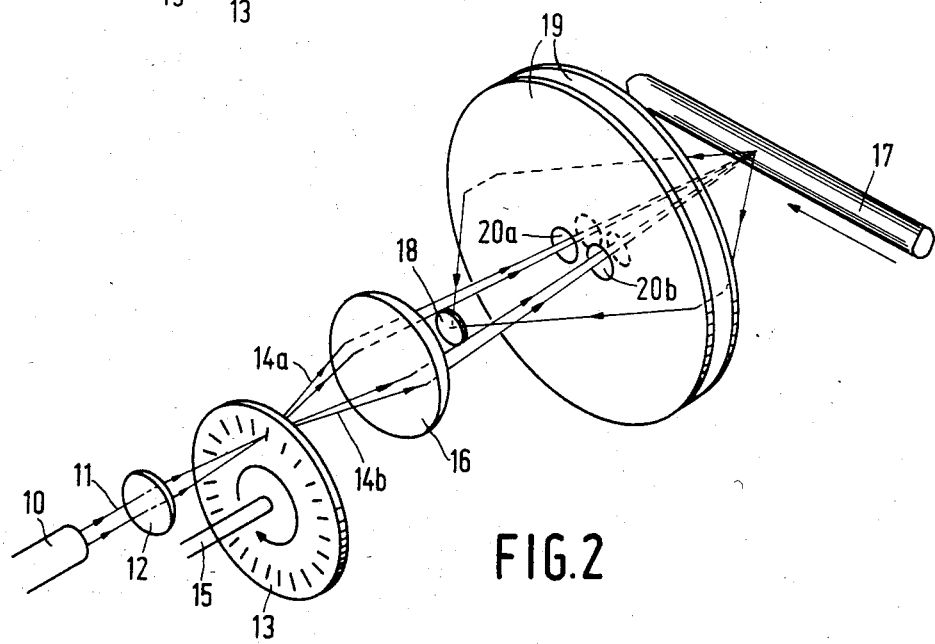
FIG. 2 shows a second form of the first (optical) stage of an arrangement embodying the invention and also serves to illustrate a method embodying the invention.

FIG. 2 shows a second form of the first (optical) stage. The beams 14a, 14b emitted from the grating 13 are here imaged on the object via a single lens 16. The reflected and scattered light is focussed onto detector 18 via a collector 19. The collector 19 is formed by two Fresnel lenses of a rather wide diameter. The further optical properties of the collector need not satisfy very stringent requirements. The lenses 12 and 16 may be of a small diameter. In the Fresnel lenses 19 apertures 20a and 20b respectively have been provided to allow passage of the beams 14a and 14b respectively. In this way a compact structure of the optical portion of the arrangement can be realized. However, the optical quality of this optical stage is lower than the optical quality of the optical stage shown in FIG. 1. A He-Ne laser is preferably used as the source.

Figure 3:
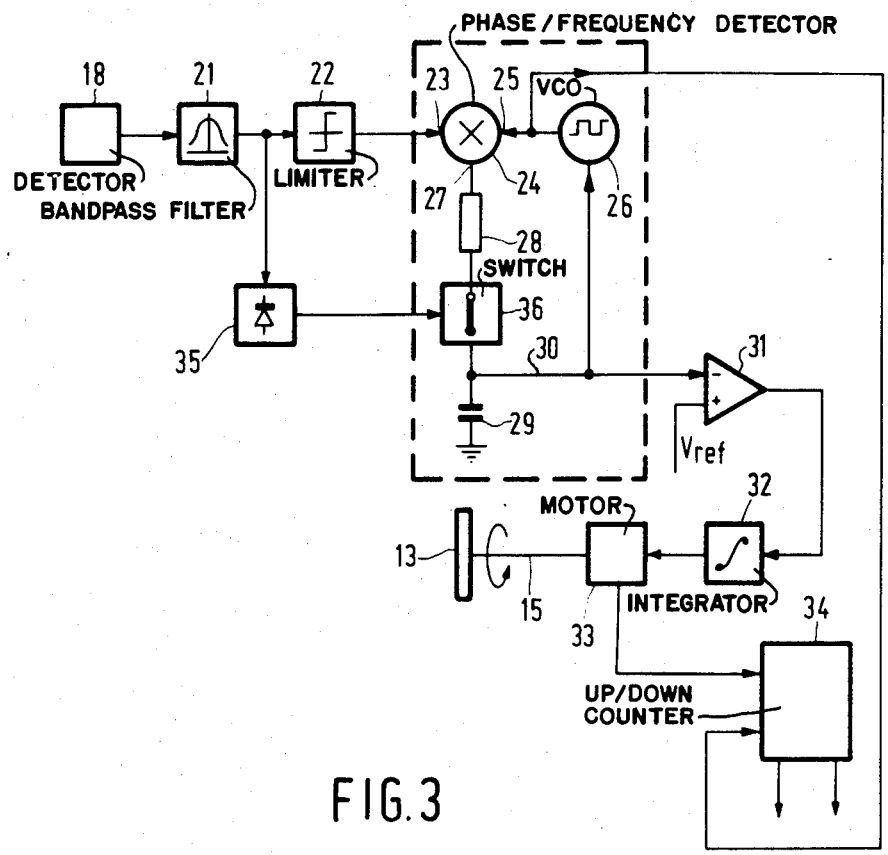
FIG. 3 shows a first form of the signal processing unit of an arrangement embodying the invention and also serves to illustrate a method embodying the invention.

FIG. 3 shows the second stage, the signal processing unit, of an arrangement embodying the invention for measuring velocity and/or length. The output signal produced by detector 18 is applied to a bandpass filter 21. Let it be assumed that bandpass filter 21 has a central frequency of 455 kHz and a 3 dB bandwidth of 60 kHz.

However, in many applications it is sufficient to construct filter 21 as a high-pass filter having a cut-off frequency in this example of 420 kHz. The filtered output signal having a frequency f is applied to a first input 23 of a phase/frequency detector 24 via a limiter 22. A voltage-controlled oscillator (VCO) 26 is connected to a second input 25 of the detector 24. The centre frequency of the VCO 26 is also 455 kHz. The phase/frequency discriminator comprising the detector 24 in combination with VCO 26 has a linear voltage-frequency characteristic between 420 and 480 kHz. A signal V which is a measure of the frequency difference between the signals applied to the first input 23 ($f_{detector}$) and the second input 25 ($f_{VCO}$) is present at an output 27 of the detector 24. After integration by an RC-network constituted by a resistor 28 connected in series with a capacitor 29 to ground, a control signal is available with which the VCO-frequency and the grating rotational speed can be controlled.

As regards the control of the speed of rotation of the grating, a branch 30 of the RC-network is connected to an inverting first input of a differential amplifier 31. A fixed reference voltage $V_{ref}$ is applied to the non-inverting second input of the differential amplifier 31. This reference voltage is chosen so that if $V=V_{ref}$, the frequency of the VCO 26 is substantially 455 kHz. The integral of the differential voltage $V_{ref}-V$, developed at the output of the differential amplifier 31, which integral is derived by an integrator 32, is used as a control voltage for the grating motor 33. If $f_{detector}>455$ kHz, then $V_{ref}-V$ will be less than 0 and the grating speed will be decreased, and vice versa.

The manner in which the grating moves is not critical. There is no need for the grating to move uniformly or to have a predetermined speed averaged in time. It may have any speed as long as the sum of the "grating preshifting frequency" and the "Doppler-frequency" is within the range of the filter. In the event of the object being stationary, the grating velocity will be comparatively high, and will be still higher when the object moves backwards, whereas the grating has a lower velocity in the case of forward movement.

As regards the control of the frequency of the VCO 26, the following should be noted. A control input of VCO 26 is also connected to branch 30 of the RC-integrator, which makes the VCO-frequency ($f_{VCO}$) equal to the detector frequency ($f_{detector}$). In the equilibrium state, wherein $V_{ref}=V$, the oscillator frequency of the VCO is equal to 455 kHz. The detector frequency is then of course also 455 kHz.

The situation is then as follows. Let $f_{grating}$ be the frequency preshift which depends on the speed of rotation of the grating and let $f_{object}$ be the Doppler frequency shift produced by the velocity of the object to be measured. Then it holds in all circumstances that:

$$f_{detector}=f_{grating}+f_{object} \quad (1)$$

The detector output frequency is controlled in the above-described manner so that it tends to remain constant. The frequency due to the movement of the object can then be determined from the frequency of the detector signal and the grating pre-shift frequency:

$$f_{object}=f_{detector}-f_{grating} \quad (2)$$

or since $f_{detector}=f_{VCO}$ it holds that:

$$f_{object}=f_{VCO}-f_{grating} \quad (3)$$

The length of the object to be measured is determined on the basis of formula (3). To that end the output signal of VCO 26 is applied to the up-counting input of an up/down counter 34, while the frequency of the grating 13 (more specifically: the frequency of a series of pulses derived from the grating movement) is applied to the downcounting input of counter 34. This frequency is determined by measuring the number of revolutions of the shaft 15 on which the grating is mounted. Because of the inherently integrating action of the up/down counter 34, the counting position of counter 34 indicates $\int f_{object} dt$, which is proportional to the length of the object to be measured. The velocity of the object can be determined by counting the net number of increments of the up/down counter per unit of time.

In addition, the arrangement comprises what is commonly referred to as a drop-out switch the purpose of which is to bridge interruptions, usually brief, in the detector signal. For that purpose the output of the bandpass filter 21 is connected to an amplitude detector 35. If the signal value detected by amplitude detector 35 decreases below a predetermined threshold value then the output signal of the phase/frequency detector is uncoupled by opening a switch 36 which is arranged between resistor 28 and capacitor 29 of the RC-integrator. If the detector signal becomes sufficiently strong again, then switch 36 is closed again.

If the drop-out is of a longer duration, then the result may be that the frequency of the VCO no longer corresponds to the frequency of the detector signal. To accomplish frequency correspondence again, a "search action" is started. Thus if the drop-out has continued for longer than a predetermined period of time, the grating 13 is rapidly stopped and thereafter accelerated until the detector frequency corresponds again to the VCO frequency. In the manner described above, the detector frequency and the VCO frequency are again adjusted to 455 kHz via the VCO control loop and the grating motor control loop. Because of the fact that the grating 13 is stopped and accelerated thereafter, an error would occur in the count of the number of revolutions (pulses) of the grating. However, during the search action the grating has generated precisely half the number of pulses to be expected and consequently during the search period the number of pulses applied to the downcounting input of up/down counter 34 must be doubled. This factor of 2 will be obvious if it is borne in mind that the average velocity of the grating during the search action is equal to half the velocity the grating had at the start of the drop-out, as the instantaneous velocity of the grating varies during the search action between the value at the beginning of the drop-out, the value O at stoppage, and the value at the end of the search action.

Otherwise the velocity correction, or the length correction, as the case may be, which becomes necessary because of the drop-out, can be calculated from the duration of the drop-out and the frequency of the VCO just prior to and just after the drop-out.

By readjusting the velocity of the grating, the filter 21 can be fixed and consequently simple. The discriminator may also be of a simple construction as it need only operate in a narrow frequency range (in the above example in the range 420–480 kHz). The simplicity of both the optical and the signal processing stages provides a compact architecture, while the high accuracy obtainable with a method and an arrangement embodying the invention renders the system particularly suitable for measuring the length of extremely long objects such as, for example, wire and cable.

Figure 4:
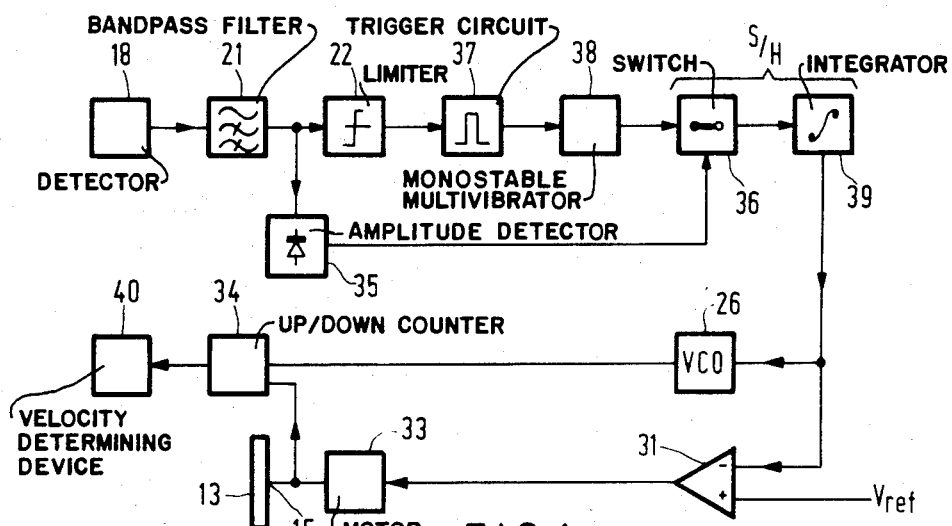
FIG. 4 shows a second form of the signal processing unit of an arrangement embodying the invention.

A second form of a signal processing unit for measuring velocity and/or length is shown in FIG. 4. The output signal produced by detector 18 is applied to a high-pass or bandpass filter 21. The filtered output signal is applied to a trigger pulse-shaping circuit 37 via a limiter 22. These trigger pulses are applied to a monostable multivibrator 38, in response to which a series of standard pulses of a constant duration and a constant amplitude appear at the output thereof. An integrator 39 is connected to the output of the monostable multivibrator 38 via a switch 36. Switch 36 is normally in the closed condition. By integration of the standard pulses, a d.c.-voltage is obtained which is proportional to the frequency of the standard pulses and consequently also to the frequency of the detector signal. As is also the case for the signal processing unit shown in FIG. 3, this d.c. voltage is used to adjust the velocity of the grating 13 so that a substantially constant detector output frequency is obtained. To that end the output of integrator 39 is connected via differential amplifier 31 to the grating motor control 33 which itself determines the speed of rotation of shaft 15. The d.c. voltage obtained from integrator 39 is also applied to a voltage-controlled oscillator (VCO) 26, in response to which an oscillator frequency which corresponds to the d.c. voltage is generated. This oscillator frequency is used in the manner already described with reference to FIG. 3 together with the grating frequency (more specifically: the frequency of a series of pulses derived from the grating movement) in up/down counter 34 to determine the length of the object to be measured. A velocitydetermining arrangement 40, which determines the velocity of the object as length per unit of time, is connected to an output of counter 34.

Also connected to the output of filter 21 is an amplitude detector 35 which has for its object to open switch 36 if the filtered output signal decreases to below a given threshold value. As a result the d.c. voltage produced by integrator 39 remains (substantially) constant and the grating continues to rotate at the velocity determined last. As soon as the signal amplitude exceeds the threshold value again, switch 36 is closed and the instantaneous value of the detector frequency determines the velocity of grating 13 and the frequency of VCO 26 again.

The second form of the signal processing unit differs from the first form (FIG. 3) in that electronically it is of a still simpler structure and in that no provisions need to be taken to again pull-in the signal from the detector when the frequency thereof is found to have changed significantly after a drop-out.

What is claimed is:

1. A method of measuring the velocity and/or length of a moving object in accordance with the Doppler principle comprising the following steps:
   (1) generating an electromagnetic wave having a given fixed frequency,
   (2) preshifting the electromagnetic wave to obtain at least one frequency shifted or phase modulated electromagnetic wave,
   (3) directing the preshifted electromagnetic wave towards the moving object,
   (4) adjusting the degree of preshift of said electromagnetic wave in a sense such that the algebraic sum of a frequency preshift and a Doppler shift produced by motion of the object is constant, whereby said Doppler shift has a predetermined fixed frequency, and
   (5) determining the velocity and/or length of the moving object from the difference between the Doppler shift and the preshift of the electromagnetic wave.

2. A method as claimed in claim 1, wherein the preshifted electromagnetic wave comprises two sub-waves which are in a fixed phase or frequency relationship to each other.

3. An arrangement for measuring the velocity and/or length of a moving object by means of the Doppler effect which comprises:
   a source for generating electromagnetic waves,
   preshifting means for producing at least one preshifted wave from the electromagnetic waves originating from the wave generating source,
   means for imaging the preshifted electromagnetic waves onto the object,
   a detector for detecting at least a portion of the electromagnetic waves reflected from the object,
   a signal processing device connected to the detector and including means for adjusting said preshifting means in response to a reflected electromagnetic wave from the moving object in a sense to bring the Doppler shift of said reflected electromagnetic wave to a given fixed frequency, and
   means responsive to signals determined by the Doppler shift and the preshift for deriving a signal indicative of the velocity and/or the length of the moving object from the difference between the Doppler shift signal and the preshift signal.

4. An arrangement as claimed in claim 3, wherein the source of electromagnetic waves comprises a laser, spectral lamp, gas discharge lamp or solid state radiator.

5. An arrangement as claimed in claim 3, wherein the means for producing pre-shifted electromagnetic waves comprises a rotatable grating and means for rotating the grating, the rate of rotation of the grating by said rotating means being adjustable.

6. An arrangement as claimed in claim 5, wherein the rotatable grating comprises a phase grating which in operation generates two subwaves of the first order (1 + and 1 − order, respectively).

7. An arrangement as claimed in claim 3, wherein at least a portion of the waves reflected from the object are focused onto the detector by a collector.

8. An arrangement as claimed in claim 7, wherein the collector comprises at least one Fresnel lens.

9. An arrangement as claimed in claim 3, characterized in that the signal processing device comprises a comparator unit and a frequency standard unit for deriving a difference frequency signal which is indicative of a difference between the frequency of the detector signal and a fixed frequency value of the frequency standard unit, in that the comparator unit is coupled to the preshifting means for adjusting the value of the pre-shifting frequency, and in that the signal processing device further comprises a measuring unit for measuring the object velocity and/or the object length from the difference between the Doppler-shift and the preshift of the electro-magnetic waves.

10. An arrangement as claimed in claim 9, characterized in that the signal processing device comprises a filter coupled to the detector for extracting the desired signal, in that the comparator unit comprises a phase/frequency detector and the frequency standard unit comprises a voltage-controlled oscillator (VCO), in that an output of the filter and an output of the VCO are coupled to the phase/frequency detector to determine the difference frequency, and in that the measuring unit comprises an up/down counter having an up-counting input coupled to the output of the VCO and a down-counting input coupled to the pre-shifting means.

11. An arrangement as claimed in claim 3, characterized in that the signal processing device comprises a d.c. voltage generating device, a voltage-controlled oscillator, a measuring unit and a difference producer, in that the d.c. voltage generating device generates a d.c. voltage signal which is proportional to the frequency of the detected signal, in that an output of the d.c. voltage generating device is connected to both a control input of the voltage-controlled oscillator and to a first input of the difference producer, in that a reference voltage is applied to a second input of the difference producer, in that an output of the difference producer is coupled to the pre-shifting means, and in that an output of the voltage-controlled oscillator and an output of the pre-shifting means are coupled to the measuring unit for determining the velocity and/or the length of the object from the difference between the frequency of the voltage-controlled oscillator and the pre-shift of the electromagnetic waves.

12. An arrangement as claimed in claim 11, characterized in that the d.c. voltage generating device comprises a filter coupled to the detector for filtering out the desired signal and in that the d.c. voltage generating device further comprises the following units: an amplifier, a limiter, a trigger pulse-shaping circuit, a monostable multivibrator, a switch and an integrator, said units being coupled in cascade and connected to an output of the filter, and in that the d.c. voltage generating device further comprises an amplitude detector coupled to the output of the filter for opening the switch if the amplitude of the output signal of the filter is below a predetermined threshold value.

13. An apparatus for measuring the velocity and/or length of a moving object by means of the Doppler effect which comprises: a source of electromagnetic waves, frequency pre-shifting means for producing at least one pre-shifted electromagnetic wave from electromagnetic waves received from the source of electromagnetic waves, means for imaging said pre-shifted electromagnetic wave onto said object whereby a moving object reflects said electromagnetic wave to impart a Doppler frequency shift thereto, a detector responsive to at least a portion of electromagnetic wave reflected from the object to produce an electric signal determined by the Doppler frequency shift, and a signal processing device coupled to the detector and responsive to said detector electric signal for producing a control voltage for adjusting said pre-shifting means so as to maintain the detector output-frequency constant, said signal processing device including a measuring unit for determining the object velocity and/or the length of the object.

14. An apparatus as claimed in claim 13 wherein said pre-shifting means comprises, a rotatable grating, and means responsive to said control voltage for adjusting the rotation speed of the grating so as to vary the frequency of said electromagnetic wave in a sense to oppose a Doppler frequency shift produced by movement of the object.

15. An apparatus as claimed in claim 13 wherein the signal processing device comprises: a voltage controlled oscillator (VC0), a comparator unit having first and second inputs and an output, a filter coupling said detector electric signal to the first input of the comparator unit, means coupling an output of the VCO to the second input of the comparator unit to produce a difference frequency signal at the output of the comparator unit, and an integration network coupled to said comparator unit output for developing said control voltage, said control voltage being coupled to the VCO to adjust the frequency thereof and to the pre-shifting means for adjustment thereof.

16. An apparatus as claimed in claim 15 further comprising, a switching device connected to said integration network, and an amplitude detector responsive to the output of the filter for selectively controlling the operation of the switching device as a function of the amplitude of an output signal of the filter.

17. An apparatus as claimed in claim 13 wherein said pre-shifting means comprises a rotatable grating whose rotation speed is varied as a function of said control voltage so as to vary the frequency of said pre-shifted electromagnetic wave in a sense so as to maintain the frequency of the detector output signal constant.

18. An apparatus as claimed in claim 17 wherein the rotatable grating is positioned between the source of electromagnetic waves and the moving object and in the path of the electromagnetic waves, and said signal processing device further comprises, a high-frequency filter coupled to said detector, a voltage controlled oscillator (VCO), a frequency/phase discriminator having first and second inputs coupled to respective outputs of the filter and the VCO, and an integration network coupled to an output of said discriminator to derive said control voltage, said control voltage being coupled to a frequency control input of the VCO and a speed control input for the rotatable grating.

19. An apparatus as claimed in claim 13 wherein said frequency pre-shifting means is located in the path of said electromagnetic waves, said source of electromagnetic waves comprises a laser device of fixed frequency and said detector is an opto-electronic detector.

* * * * *